(12) United States Patent
Bigo et al.

(10) Patent No.: US 6,817,177 B2
(45) Date of Patent: Nov. 16, 2004

(54) REPLENISHING DEVICE FOR A CLOSED CIRCUIT

(75) Inventors: Louis Bigo, Compiegne (FR); Jacques Fontaine, Vieux-Moulin (FR); Alain Mangano, Vieux-Moulin (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 10/066,361

(22) Filed: Jan. 31, 2002

(65) Prior Publication Data

US 2002/0112474 A1 Aug. 22, 2002

(30) Foreign Application Priority Data

Jan. 31, 2001 (FR) .............................. 01 01286

(51) Int. Cl.⁷ .............................................. F16D 31/02
(52) U.S. Cl. ...................................................... 60/464
(58) Field of Search ................................ 60/464, 468

(56) References Cited

U.S. PATENT DOCUMENTS

| | | | |
|---|---|---|---|
| 2,904,066 A | 9/1959 | Freeman | |
| 2,961,829 A | * 11/1960 | Weisenbach | 60/464 |
| 3,811,458 A | 5/1974 | Kuhnelt | |
| 3,866,421 A | * 2/1975 | Kersten et al. | 60/464 |
| 3,925,987 A | 12/1975 | Faisandier | |
| 4,759,261 A | 7/1988 | Flieter | 91/420 |
| 6,339,928 B1 | * 1/2002 | Gollner | 60/464 |

FOREIGN PATENT DOCUMENTS

| | | |
|---|---|---|
| DE | 19522448 | 9/1996 |
| GB | 883129 | 11/1961 |

* cited by examiner

*Primary Examiner*—F. Daniel Lopez
(74) *Attorney, Agent, or Firm*—Ladas & Parry

(57) ABSTRACT

A replenishing device for a closed circuit comprising at least one hydraulic motor and at least two main pipes which are connected to the pump to provide respectively the feed and the discharge for the motor. The device comprises a replenishing selector suitable for putting the main pipe that is at the lower pressure in communication with a valve which itself communicates with an atmospheric pressure reservoir. The replenishing selector and the valve are united in the same replenishing valve unit having an inlet suitable for being connected to the main pipe that is at the lower pressure, and an outlet which communicates continuously with the atmospheric pressure reservoir. The valve is suitable for causing the inlet to communicate with the outlet when the pressure in said main pipe reaches a given pressure threshold.

29 Claims, 4 Drawing Sheets

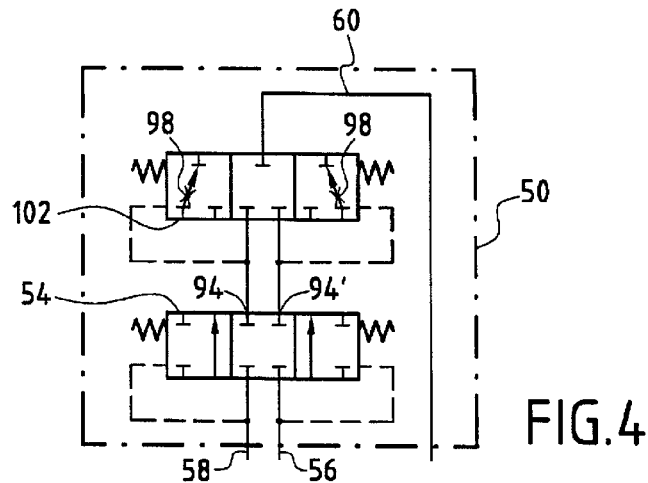
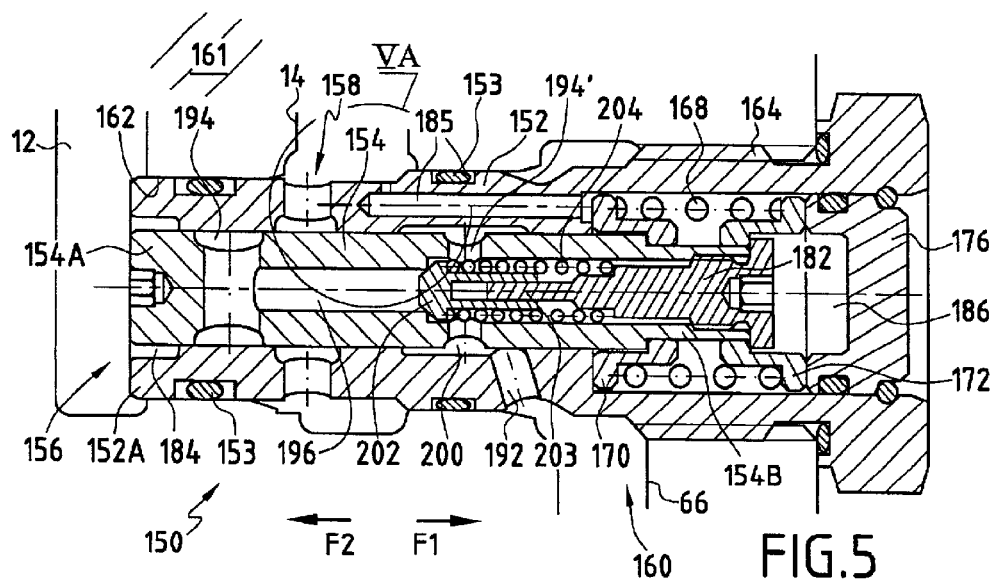
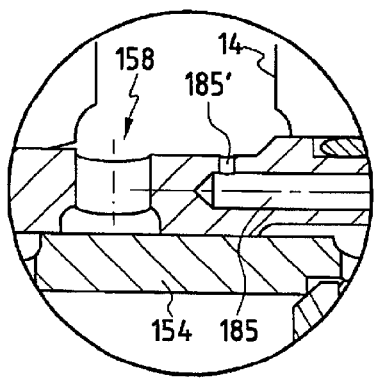
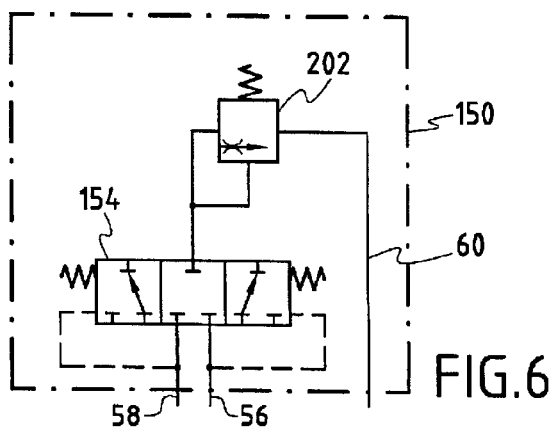

REPLENISHING DEVICE FOR A CLOSED CIRCUIT

The present invention relates to a replenishing device for a closed circuit comprising: at least one hydraulic motor having a casing which defines an internal space and in which a cylinder block is disposed; and at least two main pipes which are connected to the pump and which constitute respectively a feed main pipe and a discharge main pipe for the motor; the replenishing device comprising a replenishing selector suitable for putting the main pipe that is at the lower pressure in communication with a valve which itself communicates with an atmospheric pressure reservoir.

BACKGROUND OF THE INVENTION

In such known devices, the selector makes it possible to tap fluid from that one of the pipes which is at the lower pressure, so as to direct said fluid towards an atmospheric pressure reservoir for the purpose of cooling it before it is re-injected into the feed circuit of the hydraulic motor. It is known that it is possible to use a replenishing selector and a valve that are constituted by two distinct elements disposed one after the other in the replenishing circuit. For example, those two elements are fixed to the casing of the motor, or else they are incorporated therein. Such a configuration is shown in Document DE-195 22 448.

Devices of that type are not entirely satisfactory because it is relatively complex to install them in the motor. In addition, any given device is adapted to a motor specially organized to receive it, i.e. having recesses for receiving firstly the replenishing selector and secondly the valve.

OBJECTS AND SUMMARY OF THE INVENTION

An object of the invention is thus to provide a replenishing device that is easy to install in the replenishing circuit, in particular by being fixed directly to the casing of the hydraulic motor, that is simple to adapt to various motors from the same range of motors without it being necessary to adapt the shape of the motor in order to go from one replenishing device having given characteristics to another analogous replenishing device having other characteristics.

In addition, the Applicant has observed that it can be inopportune to tap fluid from the feed circuit of the hydraulic motor for replenishing purposes under certain operating conditions of the motor. For example, that applies during starting of the motor, during which the pressure is low and during which tapping of fluid would delay powering up.

An object of the invention is thus also to provide a replenishing device that avoids tapping of fluid for replenishing purposes under certain operating conditions of the motor.

This object is achieved by the fact that the replenishing selector and the valve are united in the same replenishing valve unit having an inlet suitable for being connected to the main pipe that is at the lower pressure, and an outlet which communicates continuously with the atmospheric pressure reservoir, the valve being suitable for causing said inlet to communicate with said outlet when the pressure in said main pipe that is at the lower pressure reaches a given pressure threshold.

The replenishing valve unit of the invention is thus in the form of a hydraulic component that is easy to install in the circuit, in particular by being mounted on the casing of the motor, so that its inlet can communicate with the main pipe that is at the lower pressure. To prevent replenishing fluid from being tapped when the pressure in the circuit is insufficient, the valve opens only as from the pressure threshold. The valve is disposed between the inlet and the outlet of the replenishing valve unit, and it causes said inlet and said outlet to communicate with each other only when the pressure in the main pipe that is at the lower pressure is sufficient, so that the outlet of said replenishing valve unit can be continuously in communication with the enclosure in which the fluid to be cooled is injected.

The replenishing valve unit constitutes a hydraulic component such as a cartridge that can be handled as a single item.

Thus, to adapt the replenishing mode to the conditions applicable for a given circuit, it is necessary merely to modify or to change the cartridge, without having to act on the other hydraulic components of the circuit.

Advantageously, the replenishing valve unit further has a constriction suitable for being interposed between the inlet and the outlet of said valve unit, when said inlet and said outlet are connected together via the valve.

The assembly formed by the valve and by the constriction constitutes a regulator for regulating the flow rate of fluid tapped by the replenishing device. Thus, the tapped fluid flow rate is zero until the pressure in the main pipe at the lower pressure reaches the pressure threshold. It then increases to reach a limit flow rate limited by the through cross-sectional area of the constriction. During this stage in which the flow rate increases, cooling of the circuit is progressively facilitated accordingly.

Advantageously, the outlet of the replenishing valve unit is connected to the atmospheric pressure reservoir via the internal space of the motor.

In which case, the fluid tapped for the replenishing also serves to flush the internal space of the casing of the motor. The fluid tapped by the replenishing valve unit is injected into the casing, while the fluid present in the casing of the motor is removed therefrom via the usual leakage return orifice. Limiting the flushing flow rate by means of the through cross-sectional area of the constriction offers the advantage of avoiding generating any undesirable excess pressure in the casing of the motor.

Preferably, when the replenishing valve unit also serves for flushing purposes, it constitutes a cartridge which is fixed directly to the casing of the motor. Thus, with a standard "motor body", it is possible, merely by changing the cartridge forming the replenishing valve unit, to choose the replenishing mode and flushing mode best suited to the use in question.

For example, it is possible to design a range of motors having in common the fact that their casings all have bores suitable for receiving such a valve unit, but differing from one another by parameters such as maximum cubic capacity, maximum torque, number of active operating cubic capacities, etc. Then the replenishing valve unit of the invention may be put in place on any one of the motors of the range in the bore provided for this purpose. If it is necessary to use replenishing valve units having different operating parameters (in particular as regards the calibration of the valve) for different motors of the same range, then no modification of the motors is necessary, but rather it is necessary merely to adapt the valve unit without modifying it externally (in particular by modifying the shape of the valve and/or the calibration of its return means) in order to obtain the desired operating parameters.

In an advantageous embodiment, the replenishing valve unit comprises a valve body and a replenishing slide, the valve body having two inlet ports respectively connected continuously to respective ones of the two main pipes and an outlet port that communicates with the atmospheric pressure reservoir, the replenishing slide being mounted to slide in the valve body by being controlled by the fluid pressure at said inlet ports acting against return means for returning the slide, so that said slide is caused to move between a neutral position in which it isolates the inlet and outlet ports, and two replenishing positions, in which that one of the first and second inlet ports which is connected to the main pipe at the lower pressure is capable of communicating with the outlet port via communication means; said replenishing valve unit further has means acting, when the slide is in the replenishing positions, to close off said communication means so long as the fluid pressure at the inlet port that is connected to the main nine at the lower pressure has not reached a given pressure threshold.

This replenishing slide, which is controlled by the pressure difference between the two main pipes, constitutes simple means for connecting the valve unit outlet to that one of the two pipes which is at the lower pressure. It is by closing off the communication means between the inlet and the outlet, inside said valve unit, that the valve makes it possible to prevent fluid from being tapped for replenishing purposes so long as the pressure has not reached the given pressure threshold.

Advantageously, the valve has a first pressure threshold as from which said valve causes the inlet and the outlet of the replenishing valve unit to communicate when said inlet is connected to the first main pipe and a second pressure threshold different from the first pressure threshold, and as from which said valve causes the inlet and the outlet of the replenishing valve unit to communicate when said inlet is connected to said second main pipe.

The replenishing valve unit in this variant is adapted to a circuit comprising a reversible motor in which, depending on how they are respectively connected to the pump, the two main pipes may serve either for feed purposes or for discharge purposes. The fact that the valve has two different pressure thresholds makes it possible to adapt the replenishing to suit the operating conditions of the motor, depending on its operating direction. In particular, the motor may have a preferred operating direction which is related to an operating parameter that is intrinsic to the motor, such as its efficiency, which is better in one direction than in the other. For example, it may be a motor having two operating cubic capacities, of the type described in Patent Applications FR-A-2 588 616 and FR-A-2 780 850. In such a motor, in low cubic capacity mode, the distribution pipes that do not contribute to providing drive torque are connected to the discharge in the preferred operating direction, and they are connected to the feed in the non-preferred direction, in which they present resistive torque opposing the drive torque.

Advantageously, the replenishing valve unit has a first constriction suitable for being interposed between the inlet and the outlet of the valve unit when said inlet is connected to the first main pipe, and a second constriction suitable for being interposed between the inlet and the outlet of the valve unit when said inlet is connected to the second main pipe.

In which case, it is the flow rate of tapped fluid that differs depending on the operating direction of the motor.

BRIEF DESCRIPTION OF THE DRAWINGS

The invention will be well understood, and its advantages will appear more clearly on reading the following detailed description of embodiments shown by way of non-limiting example. The description refers to the accompanying drawings, in which:

FIG. 4 is a diagram showing how the replenishing valve unit operates;

FIG. 5 is a view analogous to FIG. 2, but for another embodiment of the replenishing valve unit;

FIG. 5A is a detail showing a variant of FIG. 5; and

FIG. 6 is a diagram showing how the FIG. 5 valve unit operates.

MORE DETAILED DESCRIPTION

Figure 1:
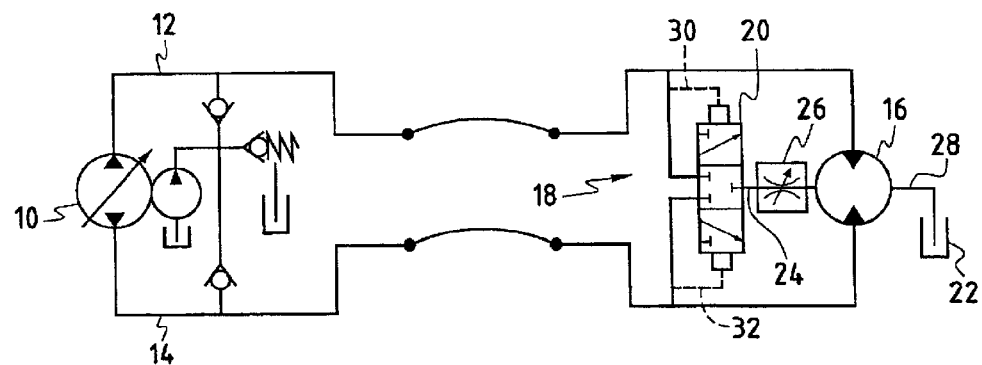
FIG. 1 is a diagram showing the drive circuit of a hydraulic motor including a replenishing device.

FIG. 1 shows a closed circuit whose main pump 10 has its orifices connected to respective ones of two main pipes 12 and 14 respectively serving as a feed pipe and as a discharge pipe for a hydraulic motor 16 to which they are connected.

In this circuit, a replenishing circuit 18 includes a replenishing selector 20 which has two inlet ports connected to respective ones of the two main pipes 12 and 14, and one outlet port which, via a removal pipe, removes the fluid tapped by the selector 20 to an atmospheric pressure reservoir 22. More precisely, the removal pipe includes a connection segment 24 which is disposed between the outlet of the selector 20 and an orifice which opens out into the casing of the motor 16. A valve 26 provided with a constriction and thus forming a flowrate regulator is disposed on this segment. Thus, under given operating conditions, the fluid tapped by the selector 20 is injected into the casing of the motor. Inside the casing, flushing takes place, and the fluid is removed via a leakage return pipe 28 which constitutes an end segment of the removal pipe. The valve 20 is controlled by control means 30 and 32 so that it is caused to go from its neutral position in which it is shown in FIG. 1, to one or other of its replenishing positions in which it connects the pipe 14 or the pipe 12 (the pipe that is at the lower pressure) to the pipe 24.

In the invention, the selector 20 and the valve 26 are united in a single valve unit referred to as the "replenishing valve unit".

The motor 16 is not shown in detail, but it may, for example, be a motor having radial pistons and of the same type as the motor described in FR-A-2 780 450.

The replenishing valve unit may be connected to the atmospheric pressure reservoir 22 either directly so as to serve for replenishing only, or else via the internal space of the motor so as to serve also to flush said space, as shown in FIG. 1 for the selector 20 and the valve 26.

A first embodiment of the replenishing valve unit of the invention is described below with reference to FIGS. 2 to 4. This replenishing valve unit 50 comprises a valve body 52 and a replenishing slide 54 mounted to move axially inside the body. The valve body is provided with two inlet ports, respectively 56 and 58, connected continuously to respective ones of the main pipes 12 and 14. It is also provided with an outlet port which communicates with the atmospheric pressure reservoir 22 via a pipe 66 advantageously connected to the internal space of the casing of the motor 16. In addition to the slide 54, the valve body contains the various component elements of the replenishing valve unit. Thus, the replenishing valve unit forms a cartridge which is put in place as a single item in the recess provided for this purpose in the casing of the motor. This valve unit thus constitutes a single item to be incorporated into the motor, and hence assembly is made simple and compactness is improved. In addition, the replenishing valve unit constitutes a working item that can be tested outside the motor before it is installed therein.

For example, the recess for the valve unit may be constituted by a blind hole 62 provided in a part 61 forming a portion of the casing of the motor, which hole is open to the outside to enable the valve body to be inserted into it, and is provided with fixing means, e.g. a thread 64, for fixing said valve unit. The main pipes 12 and 14 and the pipe 66 open out into this hole.

The hydraulic component constituted by the valve unit is thus easy to access, and it is easy to remove when necessary.

As explained below, the replenishing valve unit further comprises various elements such as springs which determine its operating parameters. The replenishing valve unit of the invention may be implemented in the form of any one of a range of different valve units distinguished from one another by parameters such as the stiffness or the calibration of the springs. All of the valve units may have similar valve bodies, thereby making it possible to mount any of the valve units in any one of analogous portions of the motor casing, having suitable recesses 62, so that it is very easy to adapt the flushing mode of the motors to the desired use.

In addition, in the event that one of the component elements of the valve unit is damaged, e.g. if a spring breaks, the fact that the valve unit is in the form of a single hydraulic component makes it easy to repair the motor and limits the risks of debris from the damaged elements escaping into the hydraulic circuit to which the motor is connected.

It should also be noted that the valve unit is subjected to precision machining, and that such machining is much easier to perform on small parts such as the valve body or the slide than on larger parts such as the casing of a hydraulic motor. The orifices of the casing that are connected to the valve unit to form its inlets 56 and 58 and its outlet 60 do not need to be calibrated, and hence a substantial saving in cost can be achieved.

Figure 2:
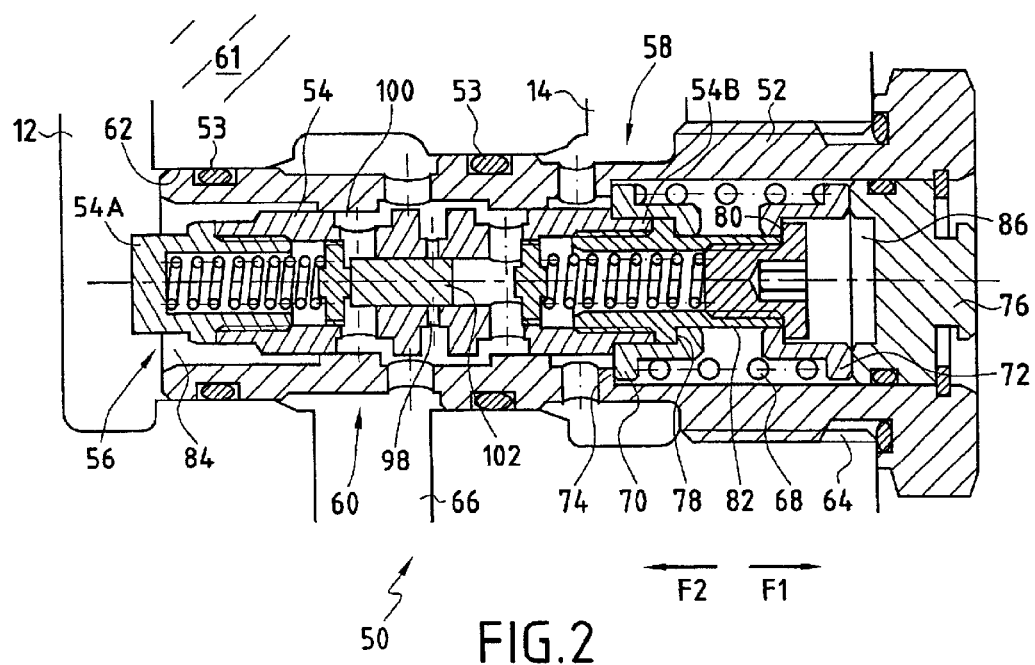
FIG. 2 is a longitudinal section view of a replenishing valve unit of the invention in a first embodiment, the replenishing slide being shown in its neutral position.

The displacement of the slide 54 of the valve unit of FIG. 2 is controlled by the fluid pressure at the inlet ports 56 and 58 acting against return means. FIG. 2 shows the slide in its neutral position, in which the inlet ports 56 and 58 and the outlet port 60 are isolated from one another. It is returned continuously to this neutral position by a return spring 68 whose ends co-operate with respective collars 70 and 72. The spring tends to urge the collars apart by bringing them into abutment respectively against a shoulder 74 formed on the inside periphery of the valve body 52, and against a stopper 76 situated at that end of the body which is opposite from said shoulder.

The end positions of the collars 70 and 72 relative to the slide 54 are themselves defined by them coming into abutment against respective shoulders 78 and 80 on the slide. In this example, the shoulders 78 and 80 are formed on a rod-shaped part 82 which is fixed to the slide by screwing.

In can be understood that, starting from the neutral position shown in FIG. 2, the slide 54 can be displaced rightwards, in the direction indicated by arrow F1. In which case the collar 70 is driven by the shoulder 78 so that it is displaced towards the stopper 76 and so that it compresses the spring 68. Meanwhile, the collar 72 remains stationary, and the slide slides relative to it. The slide can be displaced towards the left of the figure, in the direction F2. In which case, the collar 72 is driven by the shoulder 80 so as to compress the spring, while the collar 70 remains stationary.

Figure 3:
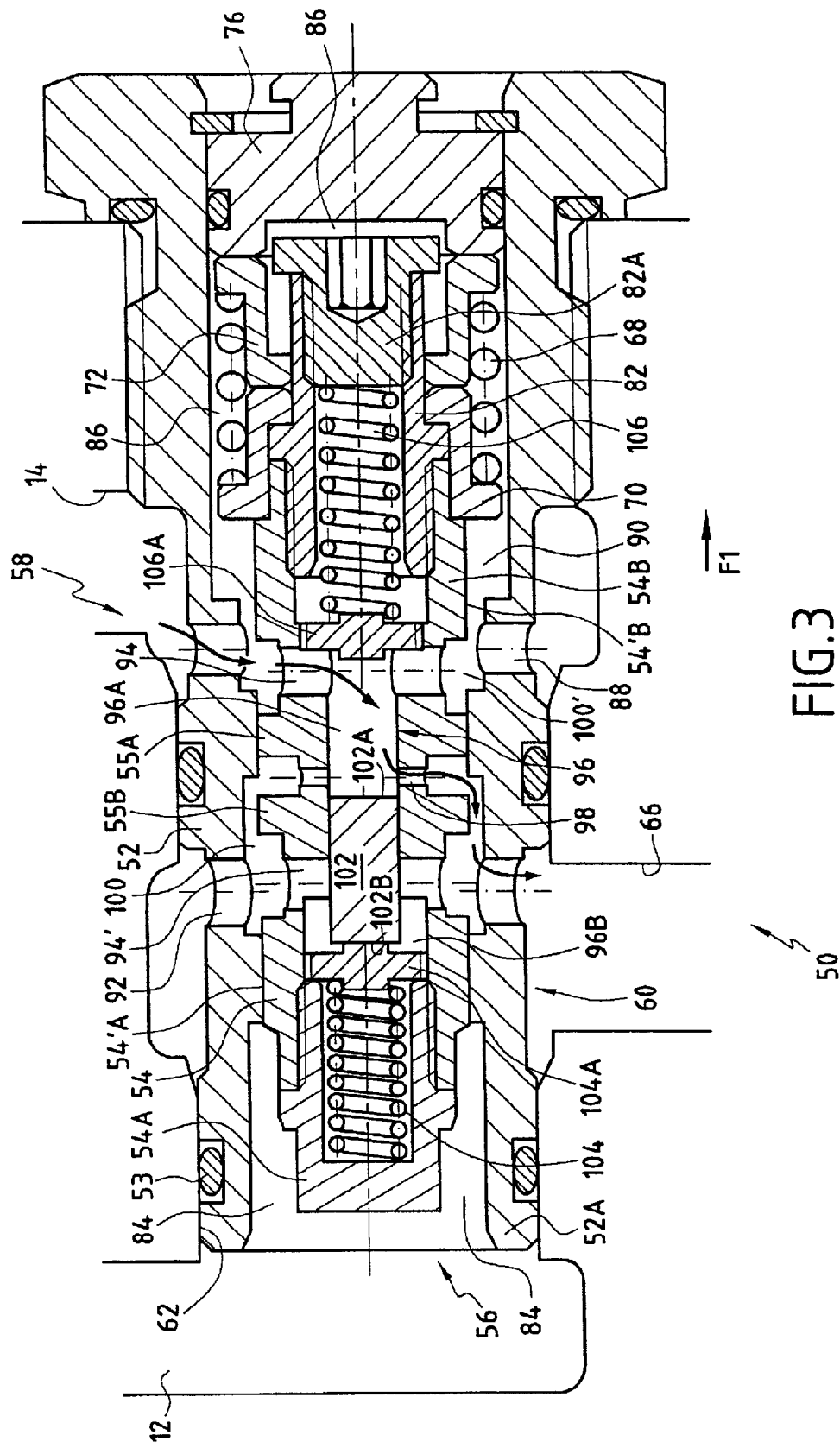
FIG. 3 shows the valve unit of FIG. 2, the replenishing slide being in a position making it possible to tap fluid.

FIG. 3 shows the slide in a replenishing position, in which it has been displaced in the direction indicated by arrow F1 over its maximum stroke, limited by the collar 70 coming into abutment against the collar 72. This displacement is controlled by the fluid pressure in the pipe 12. The valve unit 50 has a first control chamber 84 which communicates continuously with the first inlet port 56 which itself communicates with the main pipe 12. In this example, the chamber is merely provided at the end 54A of the slide that lies in the open end 52A of the body 52 that defines the first inlet port 56.

The valve unit 50 further has a second control chamber 86 which communicates continuously with the second inlet port 58 of the valve body 52. The second chamber is at the other end 54B of the slide, so that the two chambers are provided at respective ends of said slide.

The chamber 86 communicates continuously with the second inlet port 58 via a communication channel comprising one or more orifices 88 provided in the body 52, in the region of the second port 58, and an axial passageway 90 which is provided between the outside periphery of the slide 54 and the inside periphery of the valve body, and which connects the chamber 86 to the orifice(s). It should be noted that the collars 70 and 72 are split collars, through which the fluid can flow.

When the stresses exerted on the end 54A of the slide by the pressure in the chamber 84 become higher than the stresses exerted on the other end of the slide by the sum of the pressure in the chamber 86 and of the resistive forces opposed by the spring 68, then the slide can occupy its replenishing position shown in FIG. 3. When the stresses exerted on the end 54B of the slide by the pressure of the chamber 86 become higher than the sum of the stresses that are exerted by the pressure of the chamber 84 and by the spring 68, then the spring is displaced in the opposite direction.

In the position shown in FIG. 3, the inlet port 58 that is connected to the pipe 14 at the lower pressure communicates with the outlet port 60 via communication means which comprise the above-mentioned orifice(s) 88, one or more orifices provided in the slide, and one or more orifices 92 provided in the body 52, in the region of the outlet port 60. The inlet port 56 is isolated from the ports 58 and 60 by the contact between a portion 54'A of the outside periphery of the slide 54 and the inside periphery of the body 52 between the ports 56 and 60.

In this example, the slide is in the form of a hollow body that is cylindrical in overall shape and that is provided with one or more orifices 94 suitable for causing the orifice(s) 88 to communicate with its internal space 96 when in it is in its first replenishing position shown in FIG. 3. It is also provided with one or more orifices 98 which, when it is in the same position, cause said internal space 96 to communicate with an annular space 100 disposed between the outside periphery of the slide and the inside periphery of the body 52, which annular space communicates with the orifice(s) 92. These communication means advantageously have a constriction which, in this example, is constituted by the orifice(s) 98 which is/are calibrated.

The slide 54 co-operates with a piston 102 which is mounted to move relative to it between a neutral position in which it closes off the communication means, and at least one communication position in which it opens the communication means. In this example, the piston 102 is disposed in the internal space 96 in the slide.

In FIG. 2, the piston 102 is shown in a neutral position, in which it closes off the orifices 98 whereas, in FIG. 3, it is displaced leftwards so as to release said orifices. In this position, and when the slide 54 is in its first replenishing position shown in FIG. 3, the piston makes it possible for the internal space 96 of the slide to communicate with the outlet port 60 of the valve unit. If, when the slide is in the replenishing position shown in FIG. 3, the piston 102 had the same position as in FIG. 2, then the communication means would be closed off and the replenishing fluid would not be tapped.

The piston 102 is controlled to be displaced between its various positions by control means comprising a piston control chamber which, in this example, is formed in the internal space 96 of the slide and which, when the slide is in a replenishing position, is connected to the main pipe that is at the lower pressure.

In FIG. 3, it can be seen that the internal space 96 is connected to the main pipe 14 via the orifices 88 and 94. The piston 102 is continuously urged back by return means into its position in which it closes off the communication means. In this example, the slide 54 co-operates with two return springs, respectively 104 and 106, which are situated at respective ends of the piston 102. The spring 104 is retained in the slide by a stopper mounted in the end 54A thereof, while the spring 106 is held in the slide by the above-mentioned rod-shaped part 82, which part is itself provided with a stopper 82A.

When the piston 102 is in its neutral position, displacement of it is limited at either end by its ends co-operating respectively with the spring 104 and with the spring 106. It can be understood that, when the slide occupies its replenishing position as shown in FIG. 3, the pressure in the pipe 14, and thus at the inlet 58, must be sufficient for the pressure in the internal space 96 of the slide in turn to be sufficient to exert stresses on the piston 102 that are higher than those exerted by the spring 104.

In the example shown in FIGS. 2 and 3, the piston 102 is suitable for occupying first and second communication positions, into which it is caused to go respectively by feeding a first piston control chamber with fluid against first piston return means constituted by the spring 104, and by feeding a second piston control chamber with fluid against second piston return means constituted by the spring 106. The first control chamber 96A is provided, in the internal space 96 of the slide, between the end 102A of the piston and the head 106A of the spring 106 that faces it. The second piston control chamber 96B is provided between the end 102B of the piston and the head 104A of the spring 104 that faces it.

Orifices 94 in the slide 54 are connected continuously to the first control chamber 96A that they put in communication with the annular space 100' provided between the outside periphery of the slide and the inside periphery of the body 52, in the region of the orifices 88. The slide is provided with other orifices 94' which are analogous to the orifices 94 but which are connected continuously to the second control chamber 96B that they put in communication with the annular space 100. The orifices 98 which form the calibration constriction are disposed between the orifices 94 and 94'.

When the piston 102 is in the first position as shown in FIG. 3, said piston closes off the orifices 94' and communication between the annular space 100 and 100' is prevented by the contact between a projecting portion 55A of the periphery of the slide 54, and the inside periphery of the body 52 between the ports 58 and 60. The fluid thus flows between the second inlet port 58 and the outlet port 60 of the valve unit via the constriction formed by the orifices 98. Starting from its neutral position shown in FIG. 2, when the slide 54 goes to its first replenishing position shown in FIG. 3, the piston 102 remains firstly in its neutral position, thereby closing the valve unit that it constitutes with the orifices 98. When the pressure at the inlet port 58 reaches the threshold value determined by the spring 104, then the piston 102 occupies its first position and opens said valve unit to make replenishing possible.

When, starting from its neutral position, the slide 54 goes to its second replenishing position (not shown), it causes the annular space 100 to communicate with the inlet port 56 while isolating the spaces 100 and 100' by the contact between its projecting zone 55B and the inside periphery of the body 52, between the ports 56 and 60; at the same time, the inlet port 58 is isolated from the ports 56 and 60 by the contact between a portion 54'B of the outside periphery of the slide 54 and the inside periphery of the body 52 between the ports 58 and 60. In a first stage, the piston 102 occupies its neutral position by closing off the orifices 98. When the pressure at the inlet port 56 reaches the threshold value determined by the spring 106, then the piston can compress said spring and occupy its second position by making communication possible between the space 100 (connected to the port 56) and the port 60. The replenishing fluid is then tapped via the constriction formed by the orifices 98.

The piston 102 thus constitutes a valve that opens the communication means between the inlet port 56 or 58 that is at the lower pressure and the outlet port 60 only when the pressure at said inlet port is sufficient for the stresses that it exerts on the piston to overcome the resistive force opposed by the spring 104 or 106.

The orifices 94, 98, and 94' are formed in grooves provided in the outside periphery of the slide respectively between the projecting portions 54'B and 55A, the projecting portions 55A and 55B, and the projecting portions 55B and 54'A.

In the embodiment shown, when the springs 104 and 106 are relaxed, the piston heads 104A and 106A come into abutment against respective ones of shoulders formed on the inside periphery of the slide 54. The piston 102 is thus initially free to be displaced between the two heads.

In this embodiment, in which the piston can occupy two distinct communication positions by being displaced against first and second piston return means, said first and second return means are advantageously calibrated for different pressures. Thus, the above-mentioned first and second pressure thresholds are different.

In the example shown in FIGS. 2 and 3, the constriction formed by the passageways 98 occupies a single axial zone of the slide 54. However, it is possible to make provision for the replenishing valve unit to have a first constriction suitable for being interposed between its inlet and its outlet when said inlet is connected to the first main pipe and a second constriction suitable for being interposed between its inlet and its outlet when said inlet is connected to the second main pipe.

Figure 7:
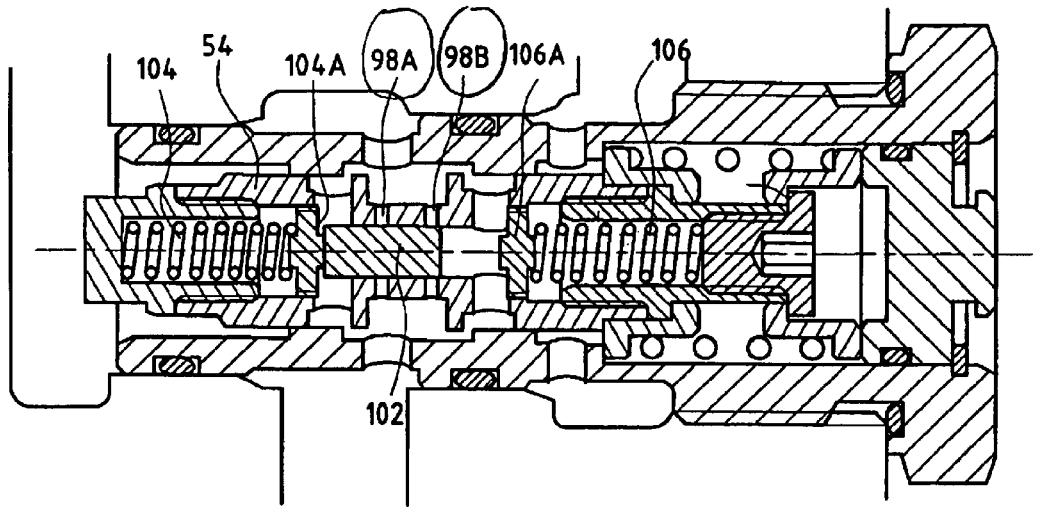
FIGS. 7–8 are views analogous to FIGS. 2–3, showing a variant embodiment.
Figure 8:
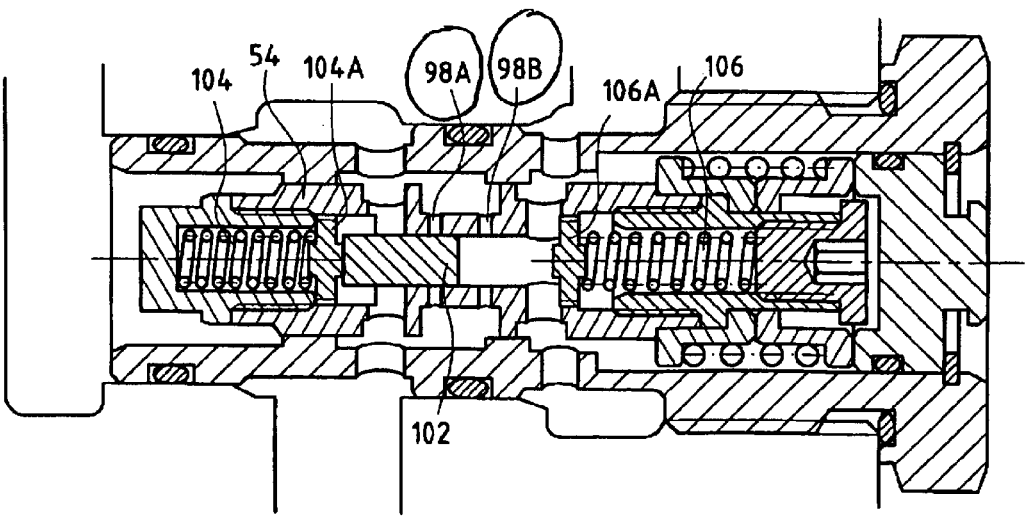

Thus, in a variant to the embodiment shown in FIGS. 2 and 3, it is possible to make provision for the first and second constrictions 98A, 98B to be formed by at least two calibrated orifices situated in two different axial zones of the slide, so that they are simultaneously closed off by the piston when said piston is in the neutral position (FIG. 7), and so that only a respective one of them is closed off when said piston is said first position and in said second position (FIG. 8).

The first constriction formed by at least the first calibrated passageway is suitable for enabling the first inlet port to be caused to communicate with the outlet port, while the second constriction formed by the second passageway is suitable for causing the second inlet port to communicate with the outlet port.

In the embodiment shown in FIGS. 2 and 3, the control chambers 84 and 86 for causing the slide to be displaced are provided at either end of said slide, and, considered in the direction in which the slide is displaced (in direction F1 in this example), the valve body 52 successively presents the first inlet port 56, the outlet port 60, and the second inlet port 58.

FIG. 5 shows a second embodiment which differs from the first embodiment in particular in that the second inlet port is situated between the first inlet port and the outlet port. The valve body 152 is disposed in a recess 162 which is provided in a part 161 such as a portion of the casing of a hydraulic motor, and in which the first main pipe 12, the second main pipe 14, and the pipe 66 open out successively. The valve body is fixed in its recess 162, e.g. by a thread 164. A slide 154 is mounted to move inside the valve body between a neutral position and two end positions that define its two replenishing positions. A first control chamber 184 connected continuously to the inlet port 156 of the valve unit, which port is itself connected to the pipe 12, makes it possible, when it is fed with fluid under pressure, to urge the slide to move in the direction F1, against return means constituted by a spring 168. This chamber 184 is situated in the vicinity of that end 154A of the slide which is situated at that end 152A of the valve body at which the first inlet port 156 is situated. At the other end 154B of the slide, a second control chamber 186 is situated that communicates continuously with the second inlet port 158 of the valve unit 150, via a control channel 185 which is provided in the valve body 152. It is thus possible for the two chambers 184 and 186 situated at respective ends of the slide to be fed with fluid respectively via the first main pipe 12 and via the second main pipe 14, in spite of the fact that the second inlet port 158 is not at the end of the valve body. The return spring 168 co-operates with the collars 170 and 172 and behaves like the spring 68 shown in FIGS. 2 and 3.

In FIG. 5, the channel 185 establishes no significant head loss between the inlet port 158 and the chamber 186. In a variant, as shown in the detail view of FIG. 5, a calibrated constriction 185' is disposed in the channel 185 to brake the displacement of the slide 154 so as to avoid any instabilities of the slide.

In FIG. 5, the slide 154 is shown in its neutral position. When the pressure in the first control chamber 184 is sufficient, it moves rightwards in the direction F1 until the collar 170 as driven by the slide comes into abutment against the collar 172, itself retained in abutment against the stopper 176. In this first replenishing position, a communication duct 196 which is formed in the slide may be put into communication with the second inlet port 158 of the valve unit via one or more orifices 194 opening out on the axial periphery of the slide.

Like the valve unit shown in FIGS. 2 and 3, the valve unit 150 of FIG. 5 has means for closing off the communication means so long as the pressure at the inlet port that is at the lower pressure has not reached a pressure threshold. Via its end opposite from the orifices 194, the duct 196 opens out on the outside periphery of the slide via one or more orifices 194' which themselves open out into an annular space 200 which is provided between the outside periphery of the slide 154 and the inside periphery of the body 152, and which communicate with the outlet port 160 of the valve unit 150 via one or more orifices 192 provided in the valve body 152. So long as the pressure in the duct 196 is not sufficient, communication between the duct 196 and the orifices 194' is prevented by a closure member constituted by a moving needle 202. This needle, which is mounted to slide on a guide rod 203 is returned continuously by a return spring 204 into its closure position in which it co-operates with that end of the duct 196 which is opposite from the orifices 194. When the pressure in the duct 196 is sufficient for exerting stresses on the head of the needle 202 that are higher than those exerted by the spring 204 on said needle, then the needle can be displaced rightwards in the direction F1 to enable the duct 196 to communicate with the orifices 194'.

The guide rod 203 is formed at the free end of a stopper 182 which is fixed to the end 154B of the slide, e.g. by screwing.

When it is the pipe 14 that is at the high pressure, and when the pressure in the chamber 156 is sufficient to displace the slide in the direction F2, leftwards in FIG. 5, the slide can occupy its second replenishing position, in which the collar 172 driven by the slide comes into abutment against the collar 170. In which case, the above-mentioned orifices 194 communicate with the first inlet port 156. The communication duct 196 is thus also fed via the same inlet port, but the needle 202 does not make it possible to tap fluid, i.e. it makes it possible for fluid to be removed to the outlet port 160 only when the pressure in the communication duct 196 is sufficient to overcome the resistive force exerted by the spring 204. Thus, in the embodiment shown in FIG. 5, the needle 202 returned by the spring 204 co-operates with the orifices 194' to constitute the valve of the replenishing valve unit. Advantageously, in this embodiment, the communication means closed off or released depending on the position of the needle have a constriction. For example, this constriction may be formed by the through cross-sectional area between the needle 202 and its seat, which area is at its maximum when the needle comes into abutment against the stopper 182. The stroke of the needle thus defines the magnitude of the constriction. It is also possible to form the constriction in the channel 196. The needle 202 constitutes a piston for which the duct 196 constitutes a control chamber.

In both of the above-described embodiments, the part 61 or 161 in which the recess 62 or 162 is provided for the valve body is advantageously constituted by the casing or by a portion of the casing of the hydraulic motor. The two main ducts that are connected to respective ones of the two main pipes 12 and 14 open out into the recess, and a removal duct 66 connected to the internal space of the casing also opens out into the recess. The valve body 52 or 152 forms a part suitable for being put in place in the recess so that its two inlet ports 56 & 58, or 156 & 158, and its outlet port 60 or 160 communicate with respective ones of the two main ducts and with the removal duct. The device has sealing means (gaskets 53 or 153) which are suitable for co-operating with the valve body and with the casing for preventing the main ducts and the removal duct from communicating with one another inside the recess otherwise than via the inlet and outlet ports of the valve body.

FIG. 4 is a diagram showing the replenishing valve unit 50, the slide 54 forming a valve element having three positions, namely a neutral intermediate position, and two replenishing end positions. The inlets of the valve element are constituted by the inlet ports 56 and 58. The outlet of the valve element communicates with the inlet of another valve element constituted by the piston 102, which also has three positions, namely a neutral position in which it prevents any communication between the inlet ports 56 and 58 and the outlet port 60, and two end positions, in which it allows communication between respective ones of the inlet ports and the outlet port.

The two valve elements are united in a single common valve unit forming the replenishing valve unit 50.

FIG. 6 is a diagram showing the embodiment of FIG. 5. The slide 154 forms a valve element having three positions, namely a neutral intermediate position and two replenishing end positions. The outlet of the valve element is connected to the outlet port 60 only when the pressure at said outlet is sufficient to enable the valve constituted by the needle 202 to open.

The valve 202 and the valve element 150 are united in a single replenishing valve unit 150.

What is claimed is:

1. A replenishing device intended to be used in a closed circuit comprising:
   a pump,
   at least one hydraulic motor; and
   at least two main pipes which are connected to the pump and which constitute respectively a feed main pipe and a discharge main pipe for the motor; the replenishing device comprising a replenishing selector suitable for putting the main pipe that is at the lower pressure in communication with a communication valve which itself communicates with an atmospheric pressure reservoir, the replenishing selector and the communication valve being united in the same replenishing valve unit having inlet means suitable for being connected to the main pipe that is at the lower pressure, and an outlet which communicates continuously with the atmospheric pressure reservoir, the communication valve being suitable for causing said inlet means to communicate with said outlet when the pressure in said main pipe that is at the lower pressure reaches given pressure threshold, and the communication valve and the replenishing selector having respective mobile elements located one in the other and movable one with respect to the other.

2. A device according to claim 1, wherein the replenishing valve unit further has a constriction suitable for being interposed between the inlet means and the outlet of said valve unit, when said inlet means end said outlet are connected together via the communication valve.

3. A device according to claim 1, wherein the replenishing valve unit has a first constriction suitable for being interposed between the inlet means and the outlet of the valve unit when said inlet means is connected to the first main pipe, and a second constriction suitable for being interposed between the inlet means and the outlet of the valve unit when said inlet means is connected to the second main pipe.

4. A device according to claim 1, wherein the communication valve has a first pressure threshold as from which said communication valve causes the inlet means and the outlet of the replenishing valve unit to communicate when said inlet means is connected to the first main pipe and a second pressure threshold different from the first pressure threshold, and as from which said communication valve causes the inlet means and the outlet of the replenishing valve unit to communicate when said inlet means is connected to said second main pipe.

5. A device according to claim 1, wherein the replenishing valve unit comprises a valve body and a replenishing elide, the valve body having two inlet ports respectively connected continuously to respective one; of the two main pipes and an outlet port that communicates with the atmospheric pressure reservoir, the replenishing slide being mounted to slide in the valve body by being controlled by the fluid pressure at said inlet ports acting against return means for returning the slide, so that said slide is caused to move between a neutral position in which said slide isolates the inlet and outlet ports, and two replenishing positions, in which that one of the first and second inlet ports which is connected to the main pipe at the lower pressure is capable of communicating with the outlet port via said inlet moans and communication means, said replenishing valve unit further having the communication valve acting, when the slide is in the replenishing positions, to close off said communication means so long as the fluid pressure at the inlet port that is connected to the main pipe at the lower pressure has not reached a given pressure threshold.

6. A device according to claim 5, wherein first and second control chambers communicating continuously respectively with the first and the second inlet ports of the valve body are provided at respective ends of the replenishing slide, and wherein, as considered in a direction in which the slide is displaced, the valve body successively presents the first inlet port, the outlet port, and the second inlet port.

7. A device according to claim 5, wherein first and second control chambers communicating continuously respectively with the first and the second inlet port of the valve body are provided at respective ends of the replenishing slide, wherein, as considered in a direction in which the slide is displaced, the valve body successively presents the first inlet port, the second inlet port and the outlet port, and wherein the first control chamber is situated at the end of the replenishing slide that is closer to the first inlet port, while the second control chamber is situated at the opposite end and communicates with the second inlet port via a control channel provided in the valve body.

8. A device according to claim 5, wherein the communication means comprise a first celibrated passageway suitable for causing the first inlet port to communicate with the outlet port, and a second calibrated passageway suitable for causing the second inlet port to communicate with the outlet port.

9. A device according to claim 5, wherein the slide co-operates with a piston mounted to move relative to the slide between a neutral position in which said piston closes off said communication means and at leant one communication position in which said piston opens said communication means, said piston being suitable for being controlled to move between said positions thereof by control means comprising a piston control chamber which, when the slide is in a replenishing position, is connected to the main pipe at the lower pressure.

10. A device according to claim 9, wherein the communication valve has a first pressure threshold as from which said, communication valve causing the inlet means and the outlet of the replenishing valve unit to communicate when said inlet mean; is connected to the first main pipe and a second pressure threshold different from the first pressure threshold, and as from which said communication valve causes the inlet means and the outlet of the replenishing valve unit to communicate when said inlet means is connected to said second main pipe, wherein the piston is suitable for occupying first and second communication positions, into which said piston is caused to go respectively by feeding a first piston control chamber with fluid against first piston return means and by feeding a second piston control chamber with fluid against second piston return means, and wherein said first and second piston return means are calibrated for different pressures.

11. A device according to claim 5, wherein the communication means comprise a calibrated passageway.

12. A closed circuit comprising:
a pump;
at least one hydraulic motor having a casing which defines an internal space and in which a cylinder block is disposed; and
at least two main pipes which are connected to the pump and which constitute respectively a feed main pipe and a discharge main pipe for the motor; and
a replenishing device comprising a replenishing selector suitable for putting the main pipe that is at the lower pressure in communication with a communication valve which itself communicates with an atmospheric pressure reservoir, the replenishing selector and the communication valve being united in the same replenishing valve unit having an inlet means suitable for being connected to the main pipe that is at the lower pressure, and an outlet which communicates continuously with the atmospheric pressure reservoir vie the internal space of the motor, the communication valve being suitable for causing said inlet means to communicate with said outlet when the pressure said main pipe that is at the lower pressure reaches a given pressure threshold, wherein the casing of the motor is provided with a recess in which two main ducts connected to respective ones of the two main pipes and a removal duct connected to the internal space of said casing open out and wherein the replenishing valve unit has a valve body that presents two inlet ports and an outlet port end that forms a part suitable for being placed in said recess such that the two inlet ports and the outlet port communicate respectively with the two main ducts and with the removal duct.

13. A closed circuit according to claim 12, wherein the outlet of the replenishing valve unit is connected to the atmospheric pressure reservoir vie the internal space of the motor.

14. A closed circuit according to claim 12, wherein the outlet of the replenishing valve unit is connected to the atmospheric pressure reservoir via the internal space of the motor, wherein the casing of the motor is provided with a recess in which two main ducts connected to respective ones of the two main pipes and a removal duct connected to the internal space of said casing open out, wherein the vulva body forms a part suitable for being put in place in said recess such that the two inlet ports and the outlet port of said valve communicate respectively with the two mum ducts, and with the removal duct, end wherein the device includes sealing means suitable for co-operating with the valve body end with said recess in the casing to prevent arty communication between said main ducts and the removal duct inside said recess otherwise then via the inlet and the outlet ports of the valve body.

15. A closed circuit according to claim 14, wherein the replenishing value unit comprises a slide that co-operates with a piston mounted to move relative to the slide between a neutral position in which said piston closes off said communication valve and at least one communication position in which said piston opens said communication valve, said piston being suitable for being controlled to move between said positions thereof by control means comprising a piston control chamber which, when the slide is in a replenishing position, is connected to the main pipe at the lower pressure.

16. A closed circuit according to claim 15, wherein the communication valve has a first pressure threshold as from which said communication valve causing the inlet means and the outlet of the replenishing valve unit to communicate when said inlet means is connected to the first main pipe and a second pressure threshold different from the first pressure threshold, and as from which said communication valve causes the inlet means and the outlet of the replenishing valve unit to communicate which said inlet means is connected to said second main pipe, wherein the piston is suitable for occupying first and second communication positions, into which said piston is caused to go respectively by feeding a first piston control chamber with fluid against first piston return means and by feeding a second piston control chamber with fluid against second piston return means, and wherein said first and second piston return means are calibrated for different pressures.

17. A closed circuit according to claim 15, wherein the communication valve has a first pressure threshold as from which said communication valve causing the inlet means and the outlet of the replenishing valve unit to communicate when said inlet means is connected to the first main pipe end a second pressure threshold different from the first pressure threshold, and as from which said communication valve causes the inlet means and the outlet of the replenishing valve unit to communicate when said inlet means is connected to said second main pipe, wherein the piston is suitable for occupying first end second communication positions, into which said piston is caused to go respectively by feeding a first piston control chamber with fluid against first piston return means and by feeding a second piston control chamber with fluid against second piston return means, and wherein said first and second piston return means are calibrated for different pressures.

18. A closed circuit according to claim 12, wherein the replenishing valve unit further has a constriction suitable for being interposed between the inlet means and the outlet of said valve unit, when said inlet means and said outlet are connected together via the communication valve.

19. A closed circuit according to claim 12, wherein the replenishing valve unit comprises a valve body and a replenishing slide, the valve body having two inlet ports respectively connected continuously to respective ones of the two main pipes and an outlet port that communicates with the atmospheric pressure reservoir, the replenishing wild, being mounted to slide in the valve body by being controlled by the fluid pressure at said inlet parts acting against return means for returning the slide, so that said slide is caused to move between a neutral position in which said slide isolates the inlet and outlet ports, and two replenishing positions, in which that one of the first and second inlet ports which is connected to the main pipe at the lower pressure is capable of communicating with the outlet port vie communication means, said replenishing valve unit further having the communication valve acting, when the slide is in the replenishing positions, to close off said communication means so long as the fluid pressure at the inlet port that is connected to the main pipe at the lower pressure has not reached a given pressure threshold.

20. A closed circuit according to claim 19, wherein first and second control chambers communicating continuously respectively with the first and the second inlet ports of the valve body are provided at respective ends of the replenishing slide, and wherein, as considered in a direction in which the slide is displaced, the valve body successively presents the first inlet port, the outlet port, and the second inlet port.

21. A closed circuit according to claim 19, wherein first and second control chambers communicating continuously respectively with the first and the second inlet port of the valve body are provided at respective ends of the replenishing slide, wherein, as considered in a direction in which the slide is displaced, the valve body successively presents the first inlet part, the second inlet port and the outlet port, and wherein the first control chamber is situated at the end of the replenishing slide that is closer to the first inlet port, while the second control chamber is situated at the opposite end and communicates with the second inlet port vim a control channel provided in the valve body.

22. A closed circuit according to claim 19, wherein the slide co-operates with a piston mounted to move relative to the slide between a neutral position in which said piston closes off said communication means and at least one communication position in which said piston opens said communication means, said piston being suitable for being controlled to move between said positions thereof by control means comprising a piston control chamber which, when the slide is in a replenishing position, is connected to the main pipe at the lower pressure.

23. A closed circuit according to claim 22, wherein the communication valve has a first pressure threshold as from which said communication valve causing the inlet means and the outlet of the replenishing valve unit to communicate when said inlet means is connected to the first main pipe end a second pressure threshold different from the first pressure threshold, and as from which said communication valve causes the inlet means end the outlet of the replenishing valve unit to communicate when said inlet means is connected to sold second main pipe, wherein the piston is suitable for occupying first end second communication positions, into which said piston is caused to go respectively by feeding a first piston control chamber with fluid against first piston return means and by feeding a second piston control chamber with fluid against second piston return means, and wherein said first and second piston return means are calibrated for different pressures.

24. A closed circuit according to claim 19, wherein the communication means comprise a calibrated passageway.

25. A closed circuit according to claim 19, wherein the communication means comprise a first calibrated passageway suitable for causing the first inlet port to communicate with the outlet port, and a second calibrated passageway suitable for causing the second inlet port to communicate with the outlet port.

26. A closed circuit according to claim 12, wherein the communication valve hue a first pressure threshold as from which said communication valve causes the inlet means and the outlet of the replenishing valve unit to communicate when said inlet means is connected to the first main pipe and a second pressure threshold different from the first pressure threshold, and as from which said communication valve causes the inlet means and the outlet of the replenishing valve unit to communicate when said inlet means is connected to said second main pipe.

27. A closed circuit according to claim 12, wherein the replenishing valve unit has a first constriction suitable for being interposed between the inlet means and the outlet of the valve unit when said inlet means is connected to the first main pipe, and a second constriction suitable for being interposed between the inlet means and the outlet of the valve unit when said inlet means is connected to the second main pipe.

28. A closed circuit according to claim 12, wherein the replenishing valve unit further has a constriction suitable for being interposed between the inlet means and the outlet of said valve unit, when said inlet means and said outlet are connected together via the communication valve, and wherein the outlet of the replenishing valve unit is connected to the atmospheric pressure reservoir vie the internal space of the motor.

29. A replenishing device intended to be used in a closed circuit comprising:

a pump, at least one hydraulic motor; and at least two main pipes which are connected to the pump and which constitute respectively a teed main pipe and a discharge main pipe for the motor; the replenishing device comprising a replenishing selector suitable for putting the main pipe that is at the lower pressure in communication with a communication valve which itself communicates with an atmospheric pressure reservoir, the replenishing selector end the communication valve being united in the same replenishing valve unit having an inlet means suitable for being connected to the main pipe that is at the lower pressure, and an outlet which communicates continuously with the atmospheric pressure reservoir, the communication valve being suitable for causing said inlet to communicate with said outlet when the pressure in said main pope that is at the lower pressure reaches a given pressure threshold, the replenishing valve unit comprising a valve body and a replenishing slide, the valve body having two inlet ports respectively intended to be connected to the respective ones of the two main pipes and an outlet port intended to communicate with the atmospheric pressure reservoir, the replenishing slide being mounted to slide in the valve body by being controlled by a fluid pressure at said inlet ports between a neutral position and two replenishing positions, first and second control chambers communicating continuously with said first and second inlet ports being provided at respective ends of the replenishing slide, wherein, as considered in a direction in which the slide is displaced, the valve body successively presents the first inlet port, the second inlet port and the outlet port and wherein the first control chamber is situated at the end of the replenishing slide that is closer to the first inlet port, while the second control chamber is situated at the opposite end and communicates with the second inlet port via a control channel provided in the valve body.

* * * * *